(12) United States Patent
Watson

(10) Patent No.: US 11,747,571 B2
(45) Date of Patent: Sep. 5, 2023

(54) FIBER CONTROL COLLAR

(71) Applicant: Ortronics, Inc., New London, CT (US)

(72) Inventor: Matthew C. Watson, Morganton, NC (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 17/575,056

(22) Filed: Jan. 13, 2022

(65) Prior Publication Data
US 2023/0221494 A1 Jul. 13, 2023

(51) Int. Cl.
*G02B 6/38* (2006.01)
(52) U.S. Cl.
CPC ......... *G02B 6/3806* (2013.01); *G02B 6/3849* (2013.01)
(58) Field of Classification Search
None
See application file for complete search history.

(56) References Cited

U.S. PATENT DOCUMENTS

| | | | | |
|---|---|---|---|---|
| 8,333,607 B1 * | 12/2012 | Moldoch | ............ | H01R 4/2433 439/367 |
| 10,310,208 B2 * | 6/2019 | Norris | ................... | G02B 6/3888 |
| 10,890,730 B2 * | 1/2021 | Petersen | .............. | G02B 6/4471 |
| 11,225,997 B2 * | 1/2022 | Estrada | ................... | F16C 1/262 |
| 2005/0215101 A1 * | 9/2005 | Pepe | .................. | H01R 13/5219 439/281 |
| 2013/0209043 A1 * | 8/2013 | Norris | ................. | G02B 6/3888 385/80 |
| 2020/0064564 A1 | 2/2020 | Ho et al. | | |

FOREIGN PATENT DOCUMENTS

| | | |
|---|---|---|
| JP | 2013 015727 A | 1/2013 |
| KR | 2011 0009064 U | 9/2011 |
| WO | WO 2019/190616 A1 | 10/2019 |
| WO | WO 2021/243076 A1 | 12/2021 |

OTHER PUBLICATIONS

PCT International Search Report and Written Opinion dated Apr. 18, 2023 for PCT/US2023/010224.
PCT/US2023/010224, Jan. 15, 2023.

* cited by examiner

*Primary Examiner* — Jerry Rahll
(74) *Attorney, Agent, or Firm* — McCarter & English, LLP

(57) ABSTRACT

An example fiber control collar is provided. The fiber control collar includes a body, an opening, and a protrusion. The body includes a front surface and an opposing rear surface. The opening is formed in and extends through the body from the front surface to the rear surface. The protrusion extends from the front surface. The fiber control collar is configured to be positioned within a complementary hollow section of a connector backshell component to maintain fibers of a fiber optic cable away from pinch points during assembly of the fiber optic connector.

20 Claims, 17 Drawing Sheets

FIBER CONTROL COLLAR

BACKGROUND

A variety of connectors are used with fiber optic cables in the telecommunications industry. During manufacturing, the fibers within the fiber optic cable are typically passed into the connector backshell component, and the connector backshell component is secured to the outside of the fiber optic cable. Internal structure of the connector backshell component separates and aligns the position of each of the ferrules extending from the fiber optic cable, such that the connector can be communicatively engaged with a corresponding adapter of a patch panel.

The connector backshell component generally includes two halves that snap or engage relative to each other to surround the fibers after the fibers have been positioned and terminated in the desired layout. A risk of pinching of the fibers exists when the two backshell component halves are engaged with each other, resulting in potentially undetectable damage to the fiber that can lead to poor performance and/or reliability issues. As the fiber count increases in fiber optic connectors, the risk of such pinching and resulting damage increases. In general, technician control is relied upon to prevent such pinching. However, the risk of damage to fibers during the manufacturing process continues to exist.

SUMMARY

Embodiments of the present disclosure provide an exemplary fiber control collar configured to surround fibers during assembly of two connector backshell components. The fiber control collar maintains the position of the fibers away from potential pinch points, thereby reducing technician error and ensuring damage-free assembly of the connector. The fiber control collar can receive fibers before or after termination, providing flexibility during assembly. The opposing connector backshell components each include a hollow section configured to at least partially receive the body of the fiber control collar, further providing an alignment feature for assembly.

In accordance with embodiments of the present disclosure, an exemplary fiber control collar is provided. The fiber control collar includes a body including a front surface and an opposing rear surface. The fiber control collar includes an opening formed in and extending through the body from the front surface to the rear surface. The fiber control collar includes a protrusion extending from the front surface.

The body and protrusion can be configured to be at least partially inserted into a complementary hollow section of a connector backshell component. The front surface can extend parallel or substantially parallel to the opposing rear surface. The body includes a tapering side wall extending from the front surface to the rear surface. The body includes a front edge at the front surface and a rear edge at the opposing rear surface, a diameter of the front edge dimensioned greater than a diameter of the rear edge. In some embodiments, the body can define a substantially conical configuration. In some embodiments, the opening can define a substantially oval or elongated oval configuration.

The protrusion can extend perpendicularly or substantially perpendicularly from the front surface. The protrusion includes a top surface, a bottom surface, side surfaces, and a front surface. The top surface of the protrusion can be aligned or substantially aligned with a bottommost surface of the opening. The bottom surface of the protrusion includes a stepped feature with a vertical section and a horizontal section. The horizontal section of the stepped feature can be aligned or substantially aligned with a bottommost edge of the front surface of the body. In some embodiments, the body can extend 360 degrees around the opening. In some embodiments, the body can extend less than 360 degrees around the opening. In such embodiments, the fiber control collar includes a gap formed in the body, the gap connecting the opening with an exterior edge of the body.

In accordance with embodiments of the present disclosure, an exemplary fiber control system is provided. The system includes a connector backshell component including a body with a hollow section formed therein, and an interior volume configured to receive means for fiber termination. The system includes a fiber control collar including a body including a front surface and an opposing rear surface, an opening formed in and extending through the body from the front surface to the rear surface, and a protrusion extending from the front surface. The hollow section of the connector backshell component is configured to at least partially receive the fiber control collar.

The hollow section of the connector backshell component includes a proximal wall and a distal wall or edge. The proximal wall can define a diameter greater than a diameter of the distal wall or edge. The hollow section of the connector backshell component can include a tapering side wall extending from the proximal wall to the distal wall or edge. The fiber control collar can include a tapering side wall extending from the front surface to the rear surface. The diameter of the front surface and the tapering side wall of the fiber control collar can be dimensioned complementary to the proximal wall and the tapering side wall of the hollow section of the connector backshell component.

In accordance with embodiments of the present disclosure, an exemplary method of fiber control is provided. The method includes feeding fibers of a fiber optic cable through an opening formed in and extending through a body of a fiber control collar. The body of the fiber control collar includes a front surface and an opposing rear surface. The fiber control collar includes a protrusion extending from the front surface. The method includes positioning the fiber control collar at least partially into a complementary hollow section of a first connector backshell component. The fiber control collar maintains the fibers in a position away from pinch points of the first connector backshell component. The method includes engaging a second connector backshell component with the first connector backshell component.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the fiber control collar, reference is made to the accompanying figures, wherein.

DETAILED DESCRIPTION

Figure 1:
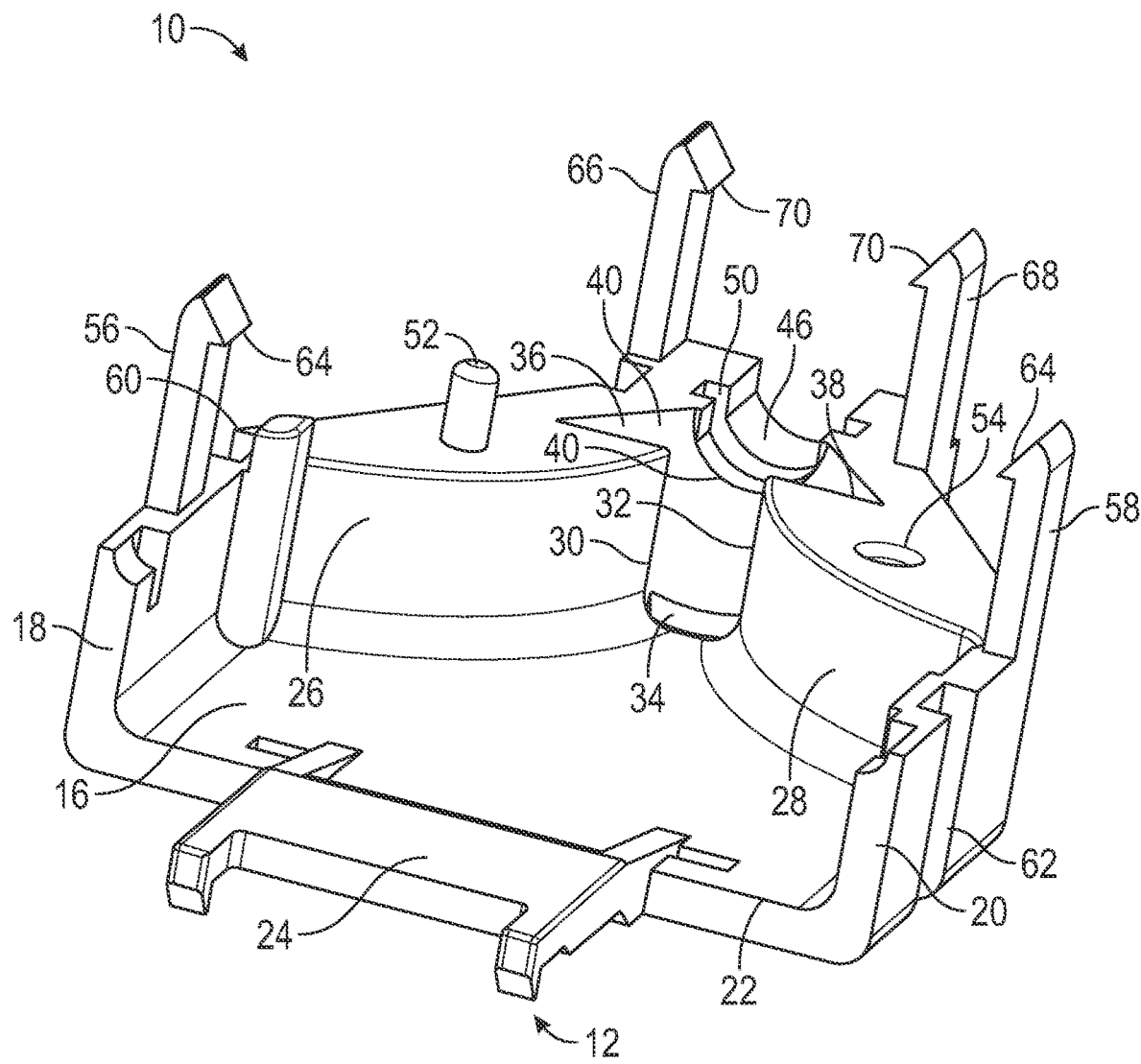
FIG. 1 is a perspective view of a connector backshell component in an exemplary embodiment.
Figure 2:
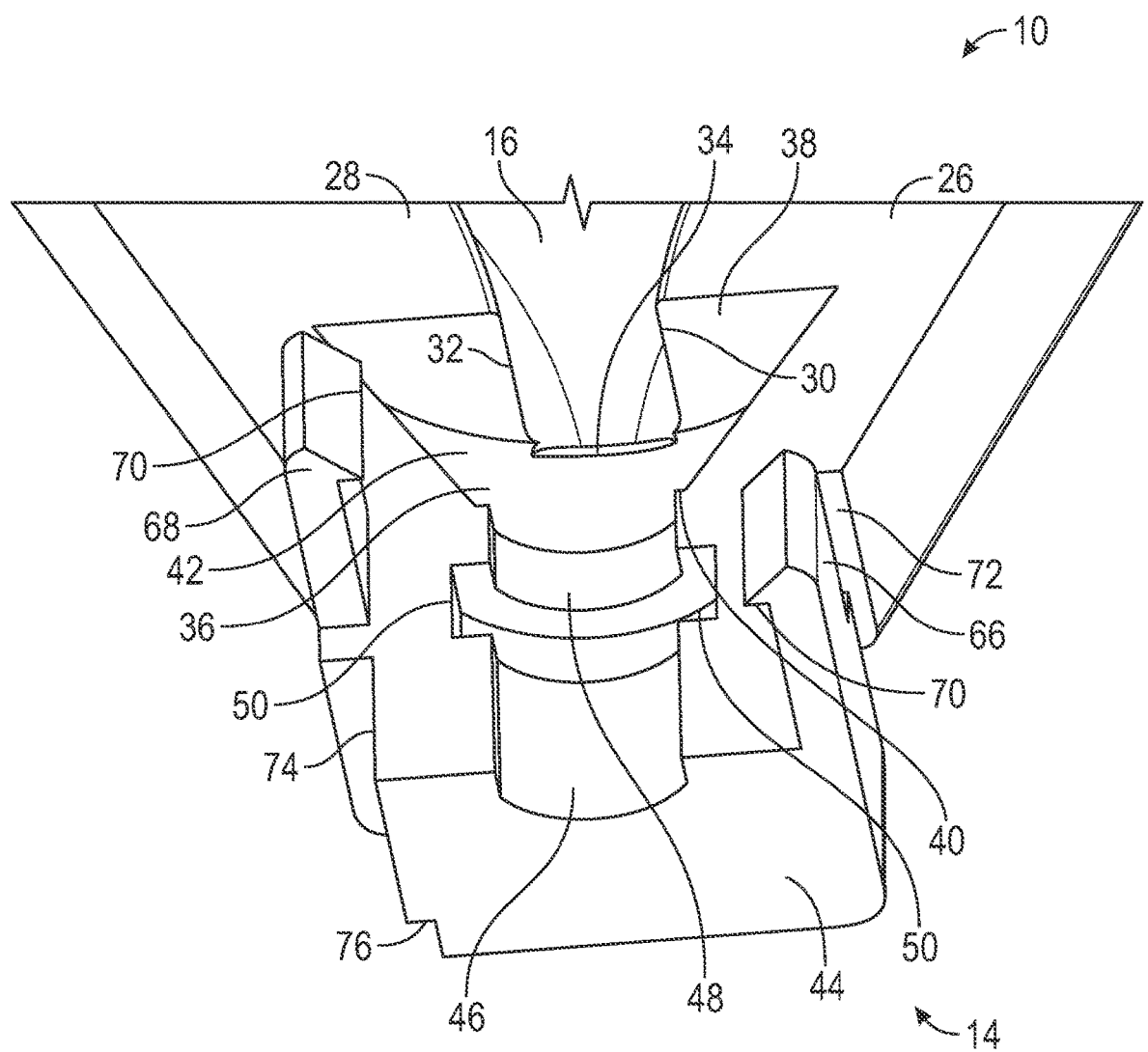
FIG. 2 is a detailed, perspective view of a connector backshell component of FIG. 1.
Figure 3:
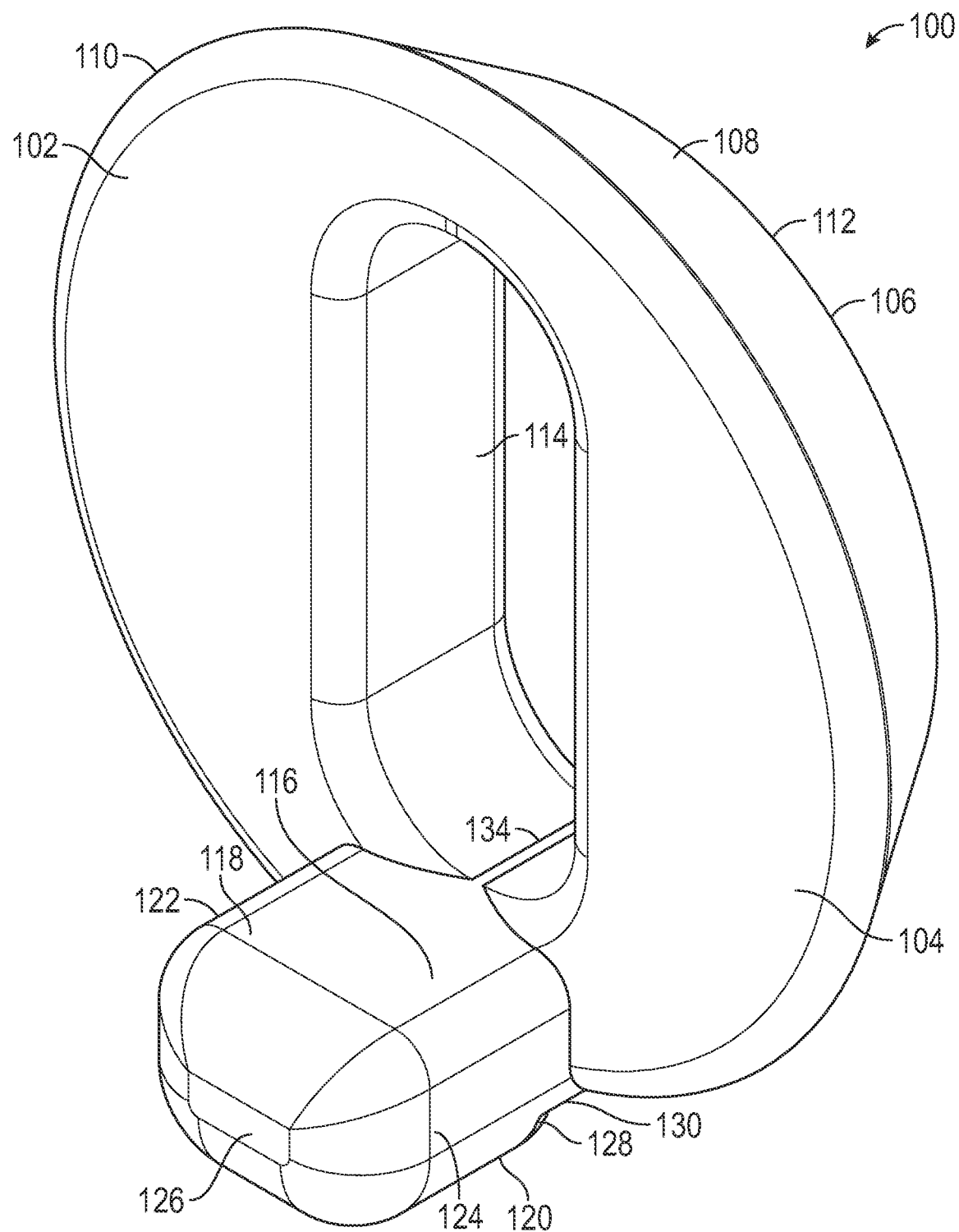
FIG. 3 is perspective view of a fiber control collar in an exemplary embodiment.
Figure 4:
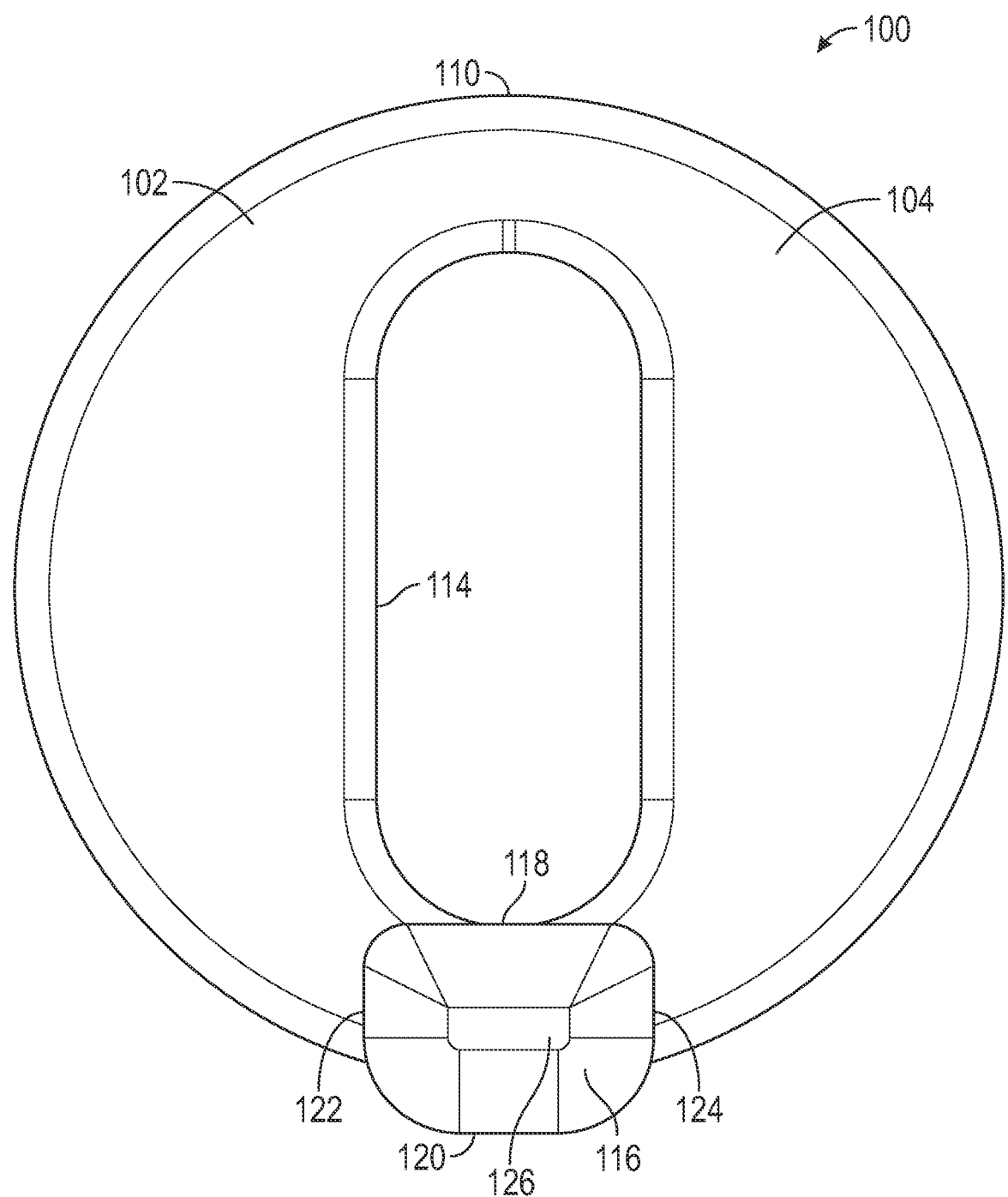
FIG. 4 is a front view of a fiber control collar of FIG. 3.
Figure 5:
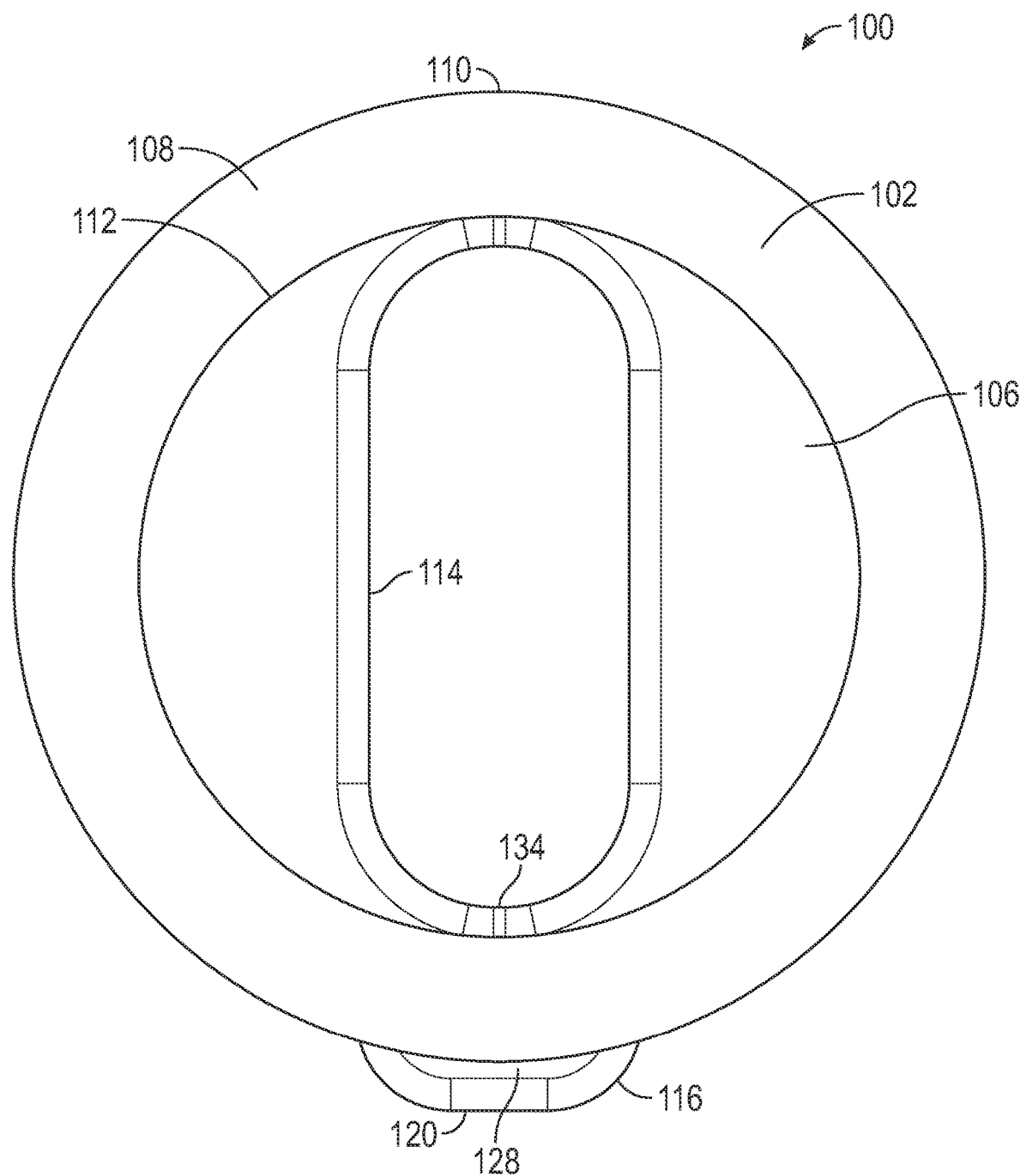
FIG. 5 is a rear view of a fiber control collar of FIG. 3.
Figure 6:
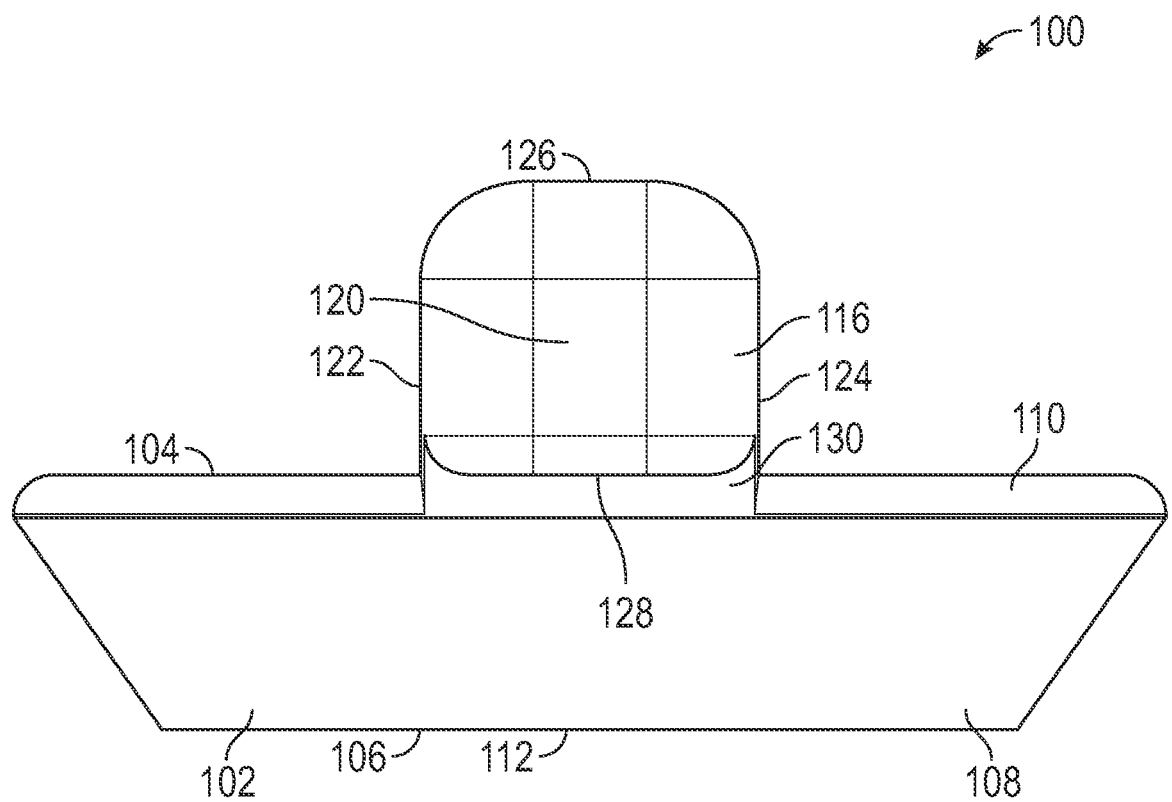
FIG. 6 is a bottom view of a fiber control collar of FIG. 3.

FIGS. 1-2 are perspective views of an exemplary connector backshell component 10 of the present disclosure. The connector backshell component 10 can be a uniboot backshell for an 8 fiber multifiber connector. However, it should be understood that other connector backshell components could be used in a similar manner as the connector backshell component 10. The connector backshell component 10 defines one half of the connector assembly, with two connector backshell components 10 capable of being interlocked relative to each other to form the full connector backshell component.

The connector backshell component 10 generally includes a body with a proximal end 12 and an opposing distal end 14. The proximal end 12 of the body includes a substantially planar base surface 16 and substantially perpendicular walls 18, 20 extending from the base surface 16. The base surface 16 and walls 18, 20 define a hollow interior in which a portion of the connector housing can be positioned for termination of ferrules of the fiber optic cable. An opening 22 leads into the hollow interior defined by the base surface 16 and walls 18, 20. A latch 24 can extend from the base surface 16 and out of the proximal end 12 of the connector backshell component 10. The latch 24 can be configured for releasable engagement with a corresponding adapter of a patch panel.

The connector backshell component 10 includes inwardly curving walls 26, 28 that extend from the walls 18, 20 to inner edges 30, 32. The edges 30, 32 extend vertically from a narrowed passage 34 within the hollow interior of the connector backshell component 10. The narrowed passage 34 extends into a hollow section 36 defining a substantially cone-shaped volume. In some embodiments, the joint between the narrowed passage 34 and the hollow section 36 can include a step 35. (See, e.g., FIG. 7). The hollow section 36 extends from a proximal wall 38 to a distal wall or edge 40, with a conical, tapering side wall 42 extending therebetween. The hollow section 36 tapers from a larger diameter at the proximal wall 38 to a smaller diameter at the distal wall or edge 40.

The distal end 14 of the connector backshell component 10 includes a substantially flat or planar distal surface 44, with the top surface including inwardly directed semi-circular grooves 46, 48. The grooves 46, 48 are separated by a primary inwardly directed semi-circular groove 50 having a diameter greater than the grooves 46, 48. The grooves 46, 48 50 can be used for crimping or otherwise coupling to the outside of the fiber optic cable to ensure secure connection between the connector backshell component 10 and the fiber optic cable.

The top, inner surface of the connector backshell component 10 includes one or more alignment features that allow for two connector backshell components 10 to be aligned and engaged relative to each other. The connector backshell component 10 can include a vertically/upwardly (e.g., perpendicularly) extending post 52 on one side of the body adjacent to the curving wall 26, and an inwardly directed aperture 54 on the opposing side of the body adjacent to the curving wall 28. When two opposing connector backshell components 10 are coupled to each other, the post 52 of the first backshell component 10 can slide into the aperture 54 of the opposing second backshell component 10, and the post 52 of the second backshell component 10 can slide into the aperture 54 of the first backshell component 10, thereby ensuring proper alignment of the backshell components 10. Although discussed herein as using two backshell components 10 engaged with each other, it should be understood that in some embodiments, only a single backshell component 10 could be used with the exemplary fiber control collar discussed herein.

The connector backshell component 10 includes latches 56, 58 perpendicularly extending from opposing walls 18, 20, and a groove or channel 60, 62 formed in the walls 18, 20 adjacent to the latches 56, 58. Each latch 56, 58 includes an engagement feature 64 (e.g., a hook-like shape) for snapping around an edge of the connector backshell component 10 during assembly. The latches 56, 58 and channels 60, 62 are laterally staggered along the walls 18, 20 such that when two opposing connector backshell components 10 are engaged with each other, the latch 56 slides through channel 62 and the latch 58 slides through channel 60 of the second connector backshell component 10 until the features 64 snap around and engage around the bottom surface or edge of the second connector backshell component 10.

The distal end 14 of the connector backshell component 10 includes a second pair of latches 66, 68 with engagement features 70, and corresponding laterally spaced channels 72, 74. The bottom surface or edge of the connector backshell component 10 can include a stepped edge 76 that allows the latches 66, 68 to snap around the edge 76 for engagement of two connector backshell components 10. A similar stepped edge can be used with latches 56, 58. During assembly of two connector backshell components 10, a risk of pinching and damaging the fibers of the fiber optic cable exists. The fiber control collar discussed herein alleviates this risk.

FIGS. 3-6 are perspective, front, rear and bottom views of an exemplary fiber control collar 100 (hereinafter "collar 100") of the present disclosure. The collar 100 includes a body 102 with a front surface 104 and an opposing rear surface 106. The body 102 can be fabricated from, e.g., plastic, rubber, metal, or the like. Both surfaces 104, 106 are substantially planar or flat, and extend substantially parallel to each other. The collar 100 includes a side wall 108 extending between the surfaces 104, 106. The side wall 108 tapers from a larger diameter at the front surface 104 and/or front edge 110, to a smaller diameter at the rear surface 106 and/or the rear edge 112. The tapering side wall 108 can assist with proper alignment of the collar 100 in the connector backshell component 10. In some embodiments, the diameter of the front edge 110 can be about, e.g., 5-10 mm inclusive, 5-9 mm inclusive, 5-8 mm inclusive, 5-7.5 mm inclusive, 5-7 mm inclusive, 5-6 mm inclusive, 6-10 mm inclusive, 7-10 mm inclusive, 7.5-10 mm inclusive, 8-10 mm inclusive, 9-10 mm inclusive, 5 mm, 6 mm, 7 mm, 7.5 mm, 8 mm, 9 mm, 10 mm, or the like. In some embodiments, the diameter of the rear edge 112 can be about, e.g., 3-8 mm inclusive, 3-7 mm inclusive, 3-6 mm inclusive, 3-5 mm inclusive, 3-4 mm inclusive, 4-8 mm inclusive, 5-8 mm inclusive, 6-8 mm inclusive, 7-8 mm inclusive, 3 mm, 4 mm, 5 mm, 6 mm, 7 mm, 8 mm, or the like. The edges 110, 112 each define a substantially circular configuration. The body 102 therefore defines a substantially conical shape. In some embodiments, the body 102 can be of a different shape, e.g., square, rectangular, or the like, with the connector backshell component 10 having a complementary space configured to at least partially receive the body 102.

The collar 100 includes an opening 114 formed in the body 102 and extending entirely through the body 102 from the front surface 104 to the rear surface 106. The opening 114 can be centered and can define a substantially oval configuration. In some embodiments, the opening 114 can be circular. In some embodiments, the width or diameter of the opening 114 can be about, e.g., 1-3 mm inclusive, 1-2.5 mm inclusive, 1-2 mm inclusive, 1-1.5 mm inclusive, 1.5-3 mm inclusive, 2-3 mm inclusive, 2.5-3 mm inclusive, 1 mm, 1.5 mm, 2 mm, 2.5 mm, 3 mm, or the like. The width or diameter of the opening 114 is selected to be dimensioned smaller than the width between the edges 30, 32 of the connector backshell component 10 to avoid pinch points typically created by the edges 30, 32. The edges of the opening 114 and the surfaces 104, 106 are curved or chamfered to reduce edges that could potentially damage fibers passing through the opening 114. The diameter of the front edge 110 is dimensioned complementary to the dimensions of the proximal wall 38 of the hollow section 36 of the connector backshell component 10. The side wall 108 of the collar 100 is angled to substantially correspond with the tapering side wall 42 of the hollow section 36 of the connector backshell component 10. This complementary configuration allows the collar 100 to be at least partially inserted into the hollow section 36, as will be discussed herein.

The collar 100 includes an alignment and/or engagement protrusion 116 extending from the front surface 104. The protrusion 116 generally defines a rectangular configuration with a top surface 118, a bottom surface 120 (extending parallel to the top surface 118), side surfaces 122, 124 (extending parallel to each other), and a front surface 126 (extending parallel to the front surface 104). In some embodiments, the protrusion 116 can be about, e.g., 2.2 mm wide (as measured between the side surfaces 122, 124), 1.6 mm high (as measured between the top and bottom surfaces 118, 120, and about 1.9 mm deep (as measured between the front surface 126 and the front surface 104. The edges at the front surface 126 are rounded or chamfered to prevent potential damage to fibers. The top surface 118 can substantially align with the bottommost surface 134 of the opening 114, e.g., the plane defined by the bottommost surface 134 of the opening 114. The bottom surface 120 extends beyond the plane defined by the bottommost surface of the front edge 110. The bottom surface 120 includes a cutout forming a stepped edge having inwardly directed vertical and horizontal surfaces 128, 130. The horizontal surface 130 of the cutout can substantially align with the bottommost edge of the front edge 110.

The width of the protrusion 116 (as measured between the side surfaces 122, 124) can be substantially complementary to the width of the narrowed passage 34 (as measured between the edges 30, 32) of the connector backshell component 10. The joint between the narrowed passage 34 and the hollow section 36 can include a step corresponding with the stepped edge of the bottom surface 120 of the collar 100. The configuration of the body 102 of the collar 100, as well as the stepped configuration of the protrusion 116, can assist with proper alignment and/or engagement of the collar 100 with the connector backshell component 10.

Figure 7:
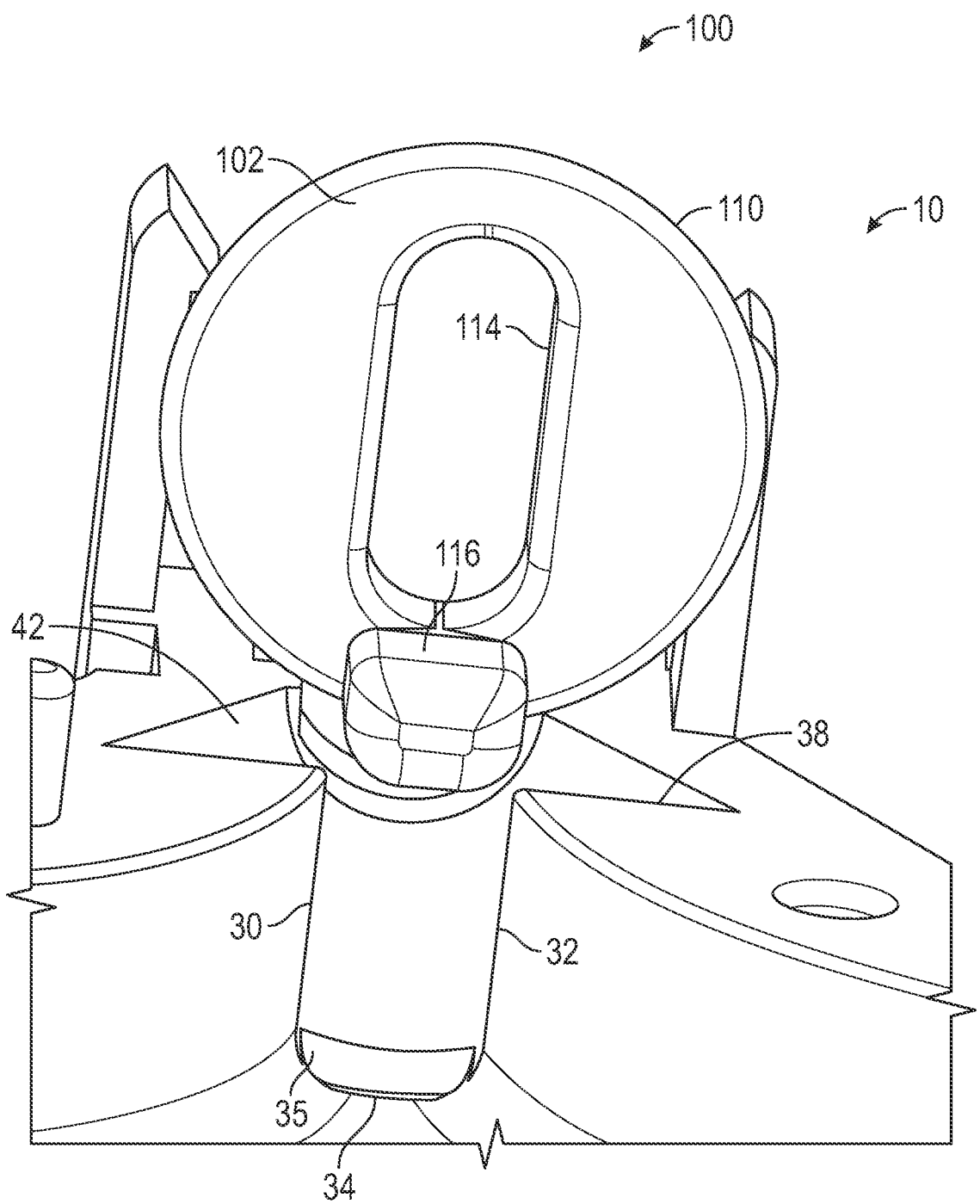
FIG. 7 is a perspective view of a fiber control collar of FIG. 3 prior to insertion into a connector backshell component of FIG. 1.
Figure 8:
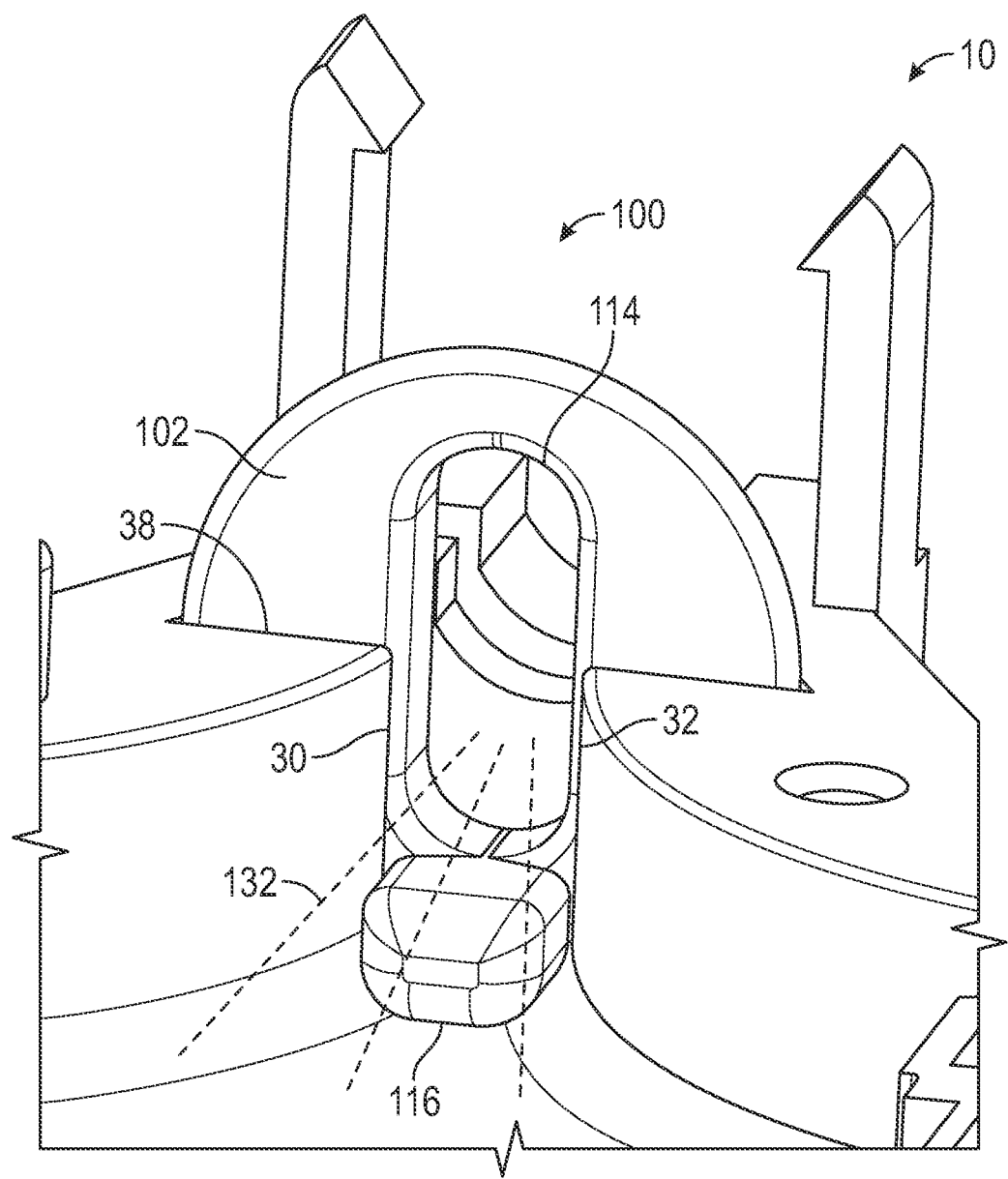
FIG. 8 is a perspective view of a fiber control collar of FIG. 3 inserted into a connector backshell component of FIG. 1.
Figure 9:
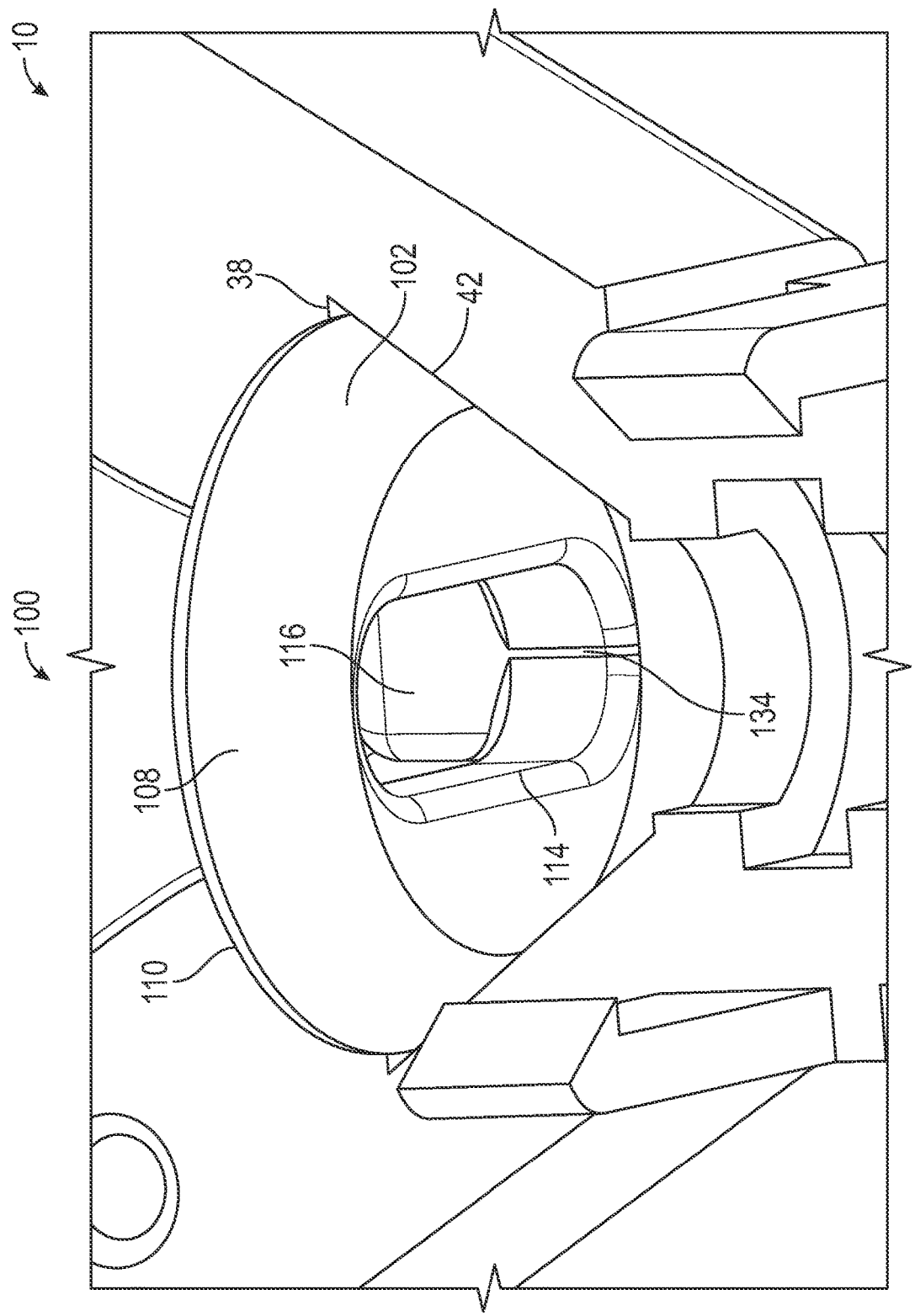
FIG. 9 is a perspective view of a fiber control collar of FIG. 3 inserted into a connector backshell component of FIG. 1.
Figure 10:
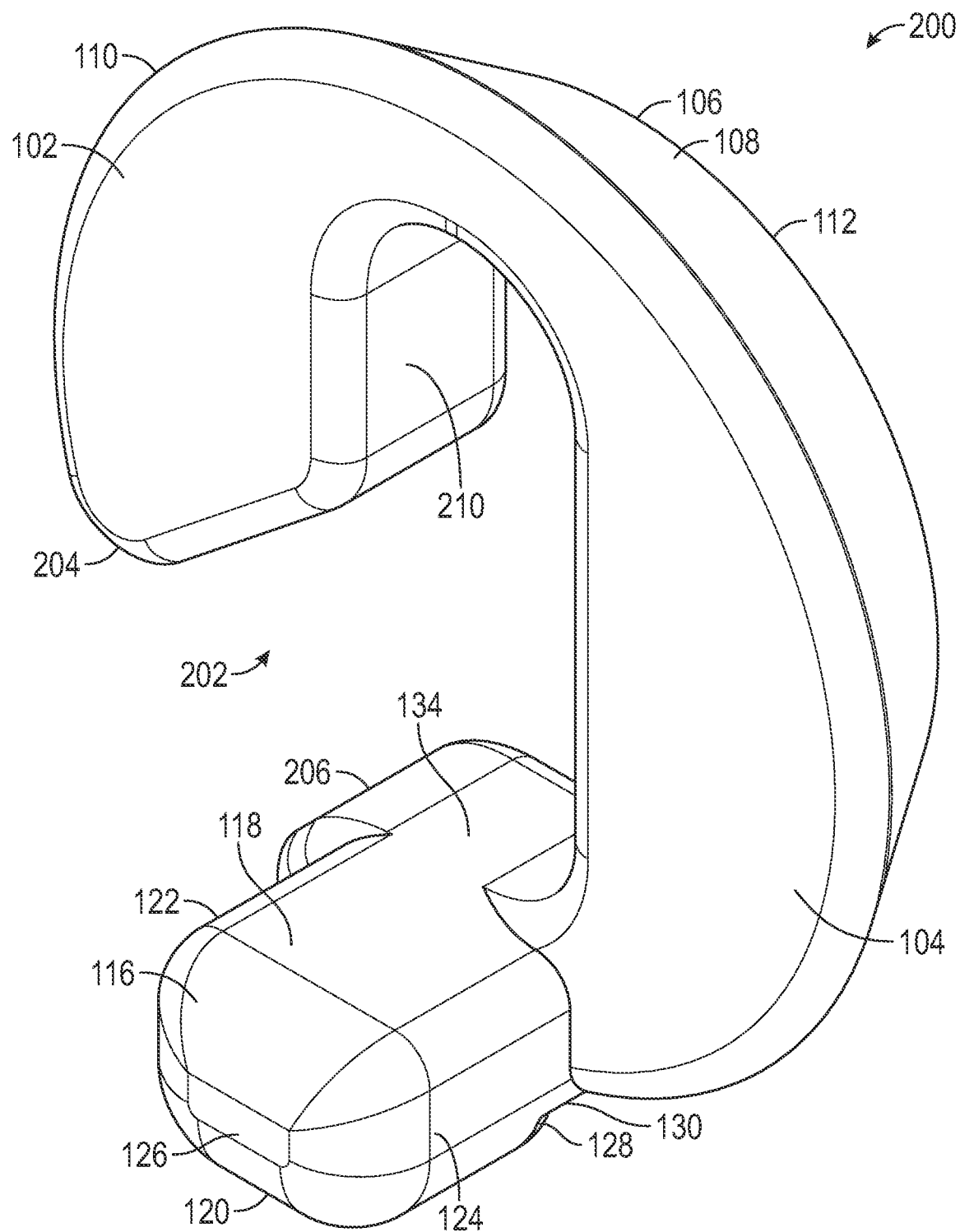
FIG. 10 is perspective view of a fiber control collar in an exemplary embodiment.
Figure 11:
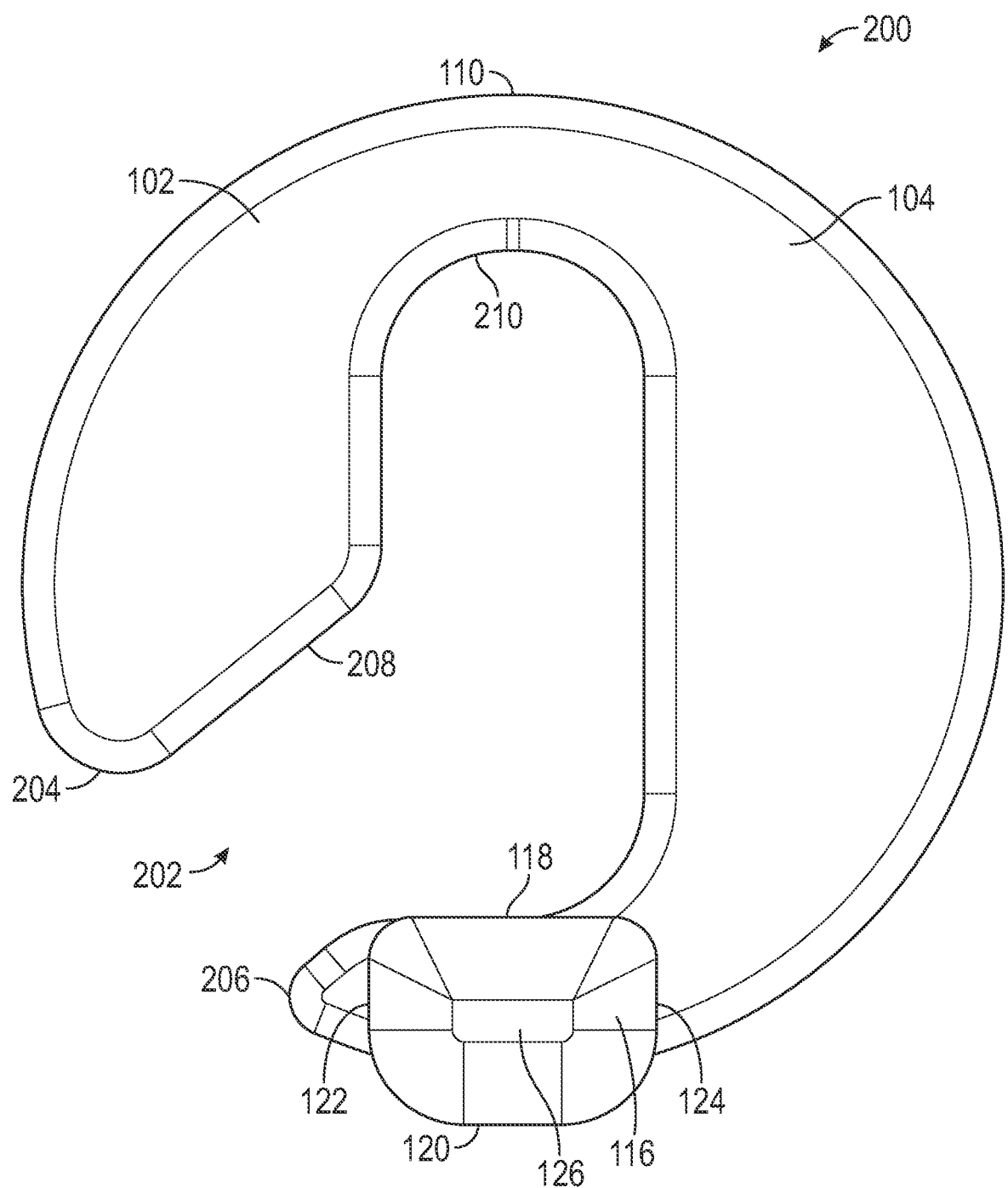
FIG. 11 is a front view of a fiber control collar of FIG. 10.
Figure 12:
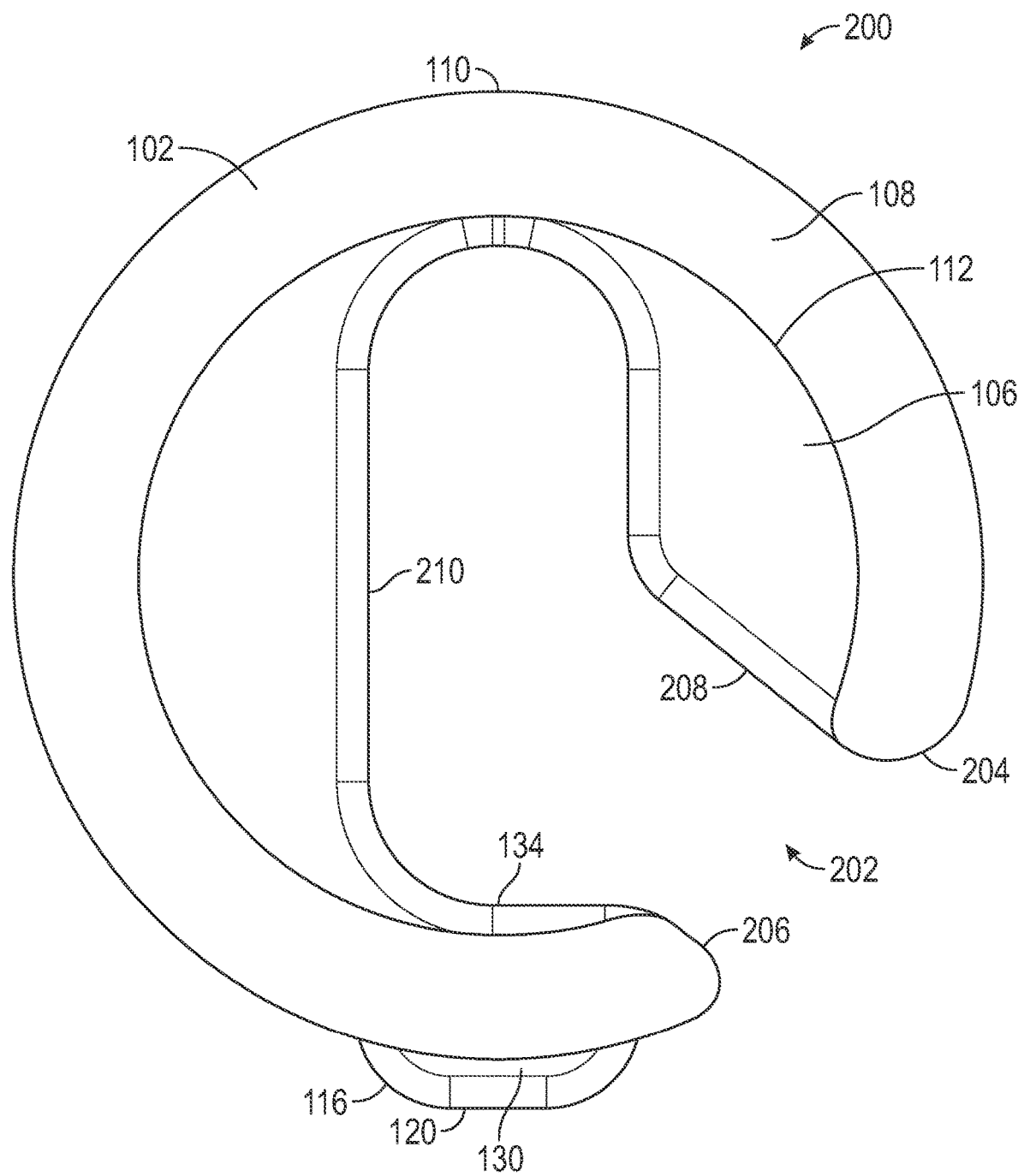
FIG. 12 is a rear view of a fiber control collar of FIG. 10.
Figure 13:
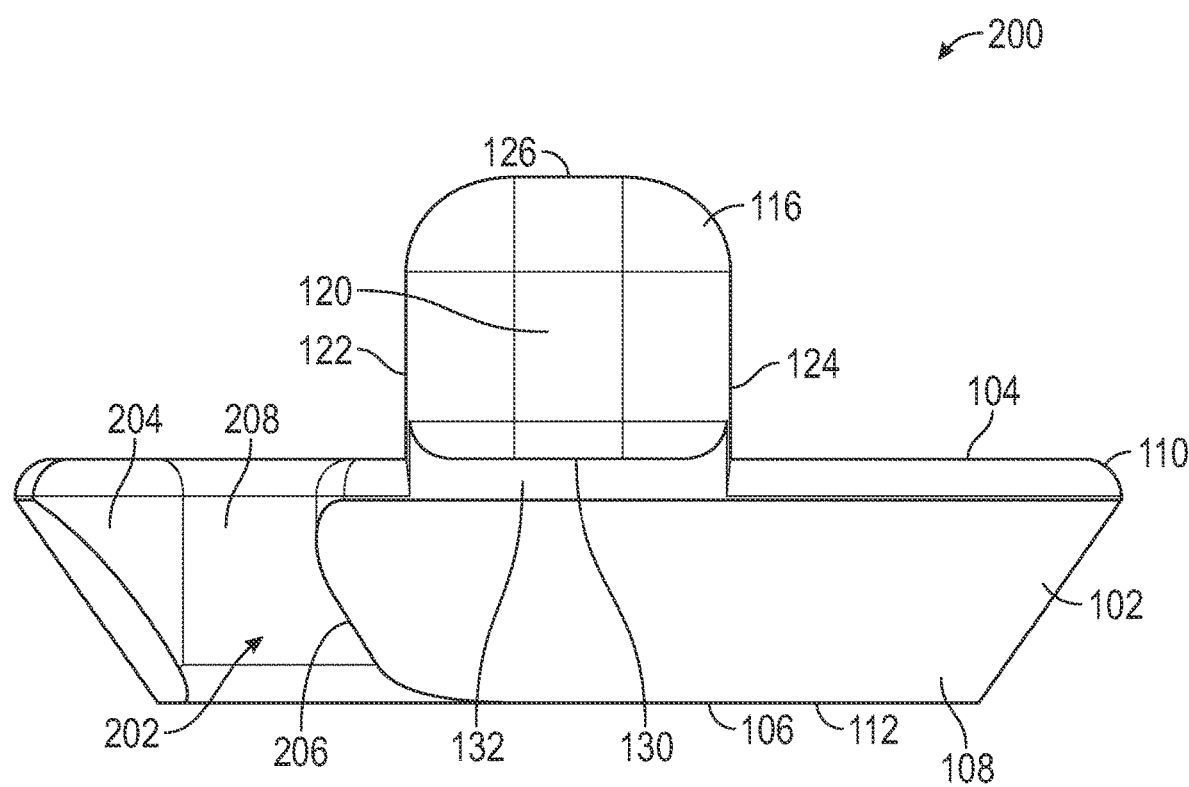
FIG. 13 is a bottom view of a fiber control collar of FIG. 10.

FIGS. 7-9 show engagement of the collar 100 with the connector backshell component 10. During assembly, fibers 132 of a fiber optic cable can initially be fed through the opening 114 of the collar 100. The collar 100 can be nested or at least partially inserted into the hollow section 36 of the connector backshell component 10. The tapered configuration of the body 102 of the collar 100 ensures proper alignment of the collar 100 with the connector backshell component 10. The protrusion 116 further ensures proper orientation of the collar 100 relative to the connector backshell component 10 during assembly. As the collar 100 is inserted into the hollow section 36, a friction fit can maintain the collar 100 engaged with the connector backshell component 10. After engagement, as shown in FIGS. 8-9, the fibers can be terminated with one or more connector housings positioned within the connector backshell component 10. The fiber optic cable can be positioned on the grooves 46, 48 of the first connector backshell component 10, and a second connector backshell component 10 can subsequently be positioned over the first connector backshell component 10. The hollow section 36 of the second connector backshell component 10 receives the exposed portion of the collar 100 and the engagement features of the two connector backshell components 10 interlock to releasably snap the connector backshell components 10 together. During such engagement, the fibers 132 are maintained within the opening 114 of the collar 100, ensuring the fibers 132 are maintained away from any potential pinch points of the connector backshell component 10. The collar 100 thereby prevents damage to the fibers during assembly, reducing chances of technician error during the manufacturing process.

FIGS. 10-13 are perspective, front, rear and bottom views of an exemplary fiber control collar 200 (hereinafter "collar 200") of the present disclosure. The collar 200 can be substantially similar in structure and/or function to the collar 100, except for the distinctions noted herein. Therefore, like references numbers are used to refer to like structures. Rather than a body 102 defining a full, 360 degree configuration, the body 102 of the collar 200 defines a substantially C-shaped configuration (e.g., backwards C-shaped configuration when viewed from the front). The body 102 of the collar 200 includes a gap 202 between opposing ends 204, 206 of the body 102. The body 102 therefore only radially extends a partial stance (e.g., less than 360 degrees). The size of the gap 202 is selected to accommodate passage of 250 μm fibers therethrough. In some embodiments, the width of the gap 202 (as measured between the ends 204, 206, can be about, e.g., 1-2.5 mm inclusive, 1-2 mm inclusive, 1-1.5 mm inclusive, 1.5-2.5 mm inclusive, 2-2.5 mm inclusive, 1 mm, 1.5 mm, 2 mm, 2.5 mm, or the like. In some embodiments, the end 204 can include an inwardly sloping surface 208, providing for a longer radial extension of the body 102 at or near the outermost surface of side wall 108 as compared to the innermost surface at the opening 210.

Figure 14:
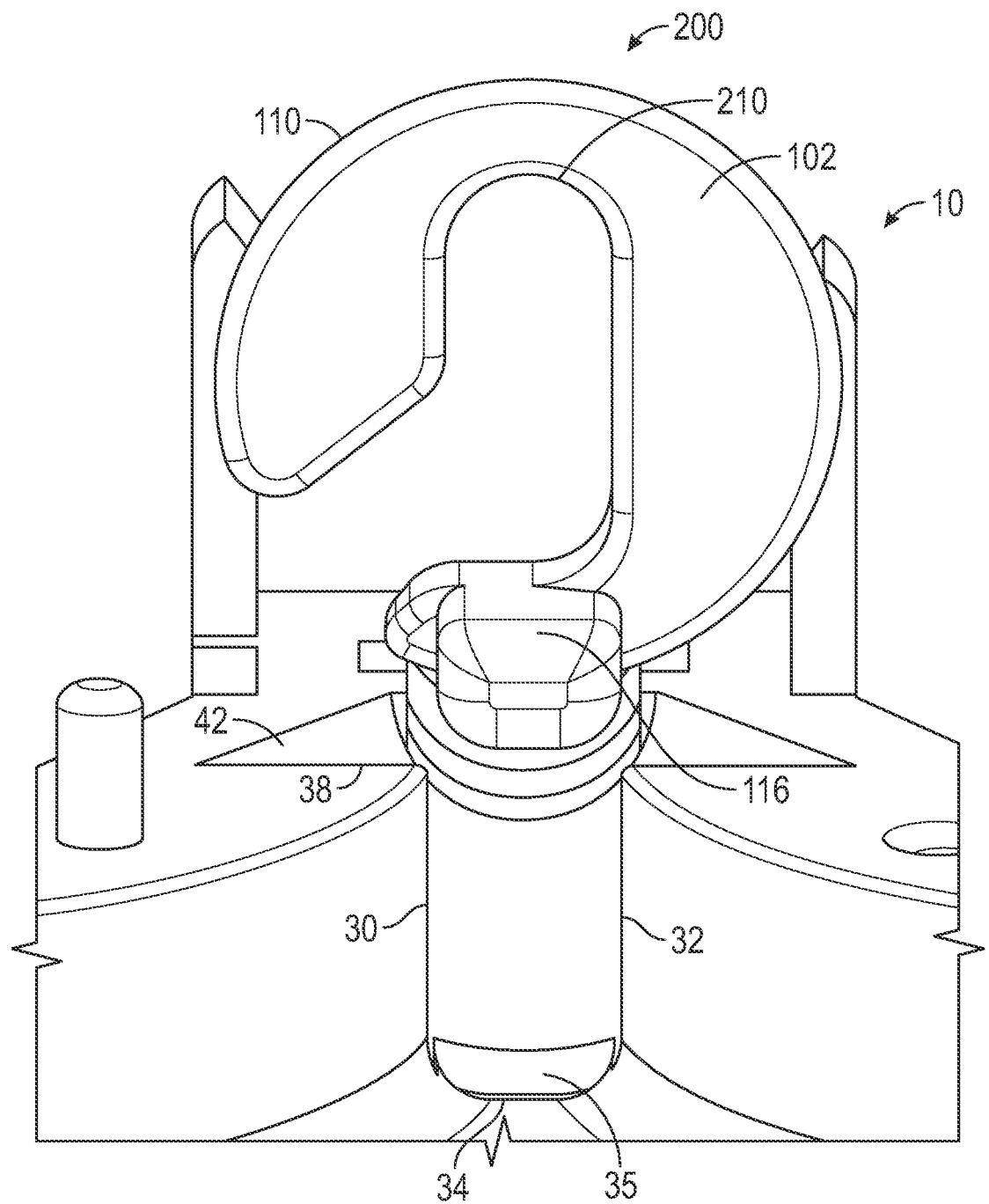
FIG. 14 is a perspective view of a fiber control collar of FIG. 10 prior to insertion into a connector backshell component of FIG. 1.
Figure 15:
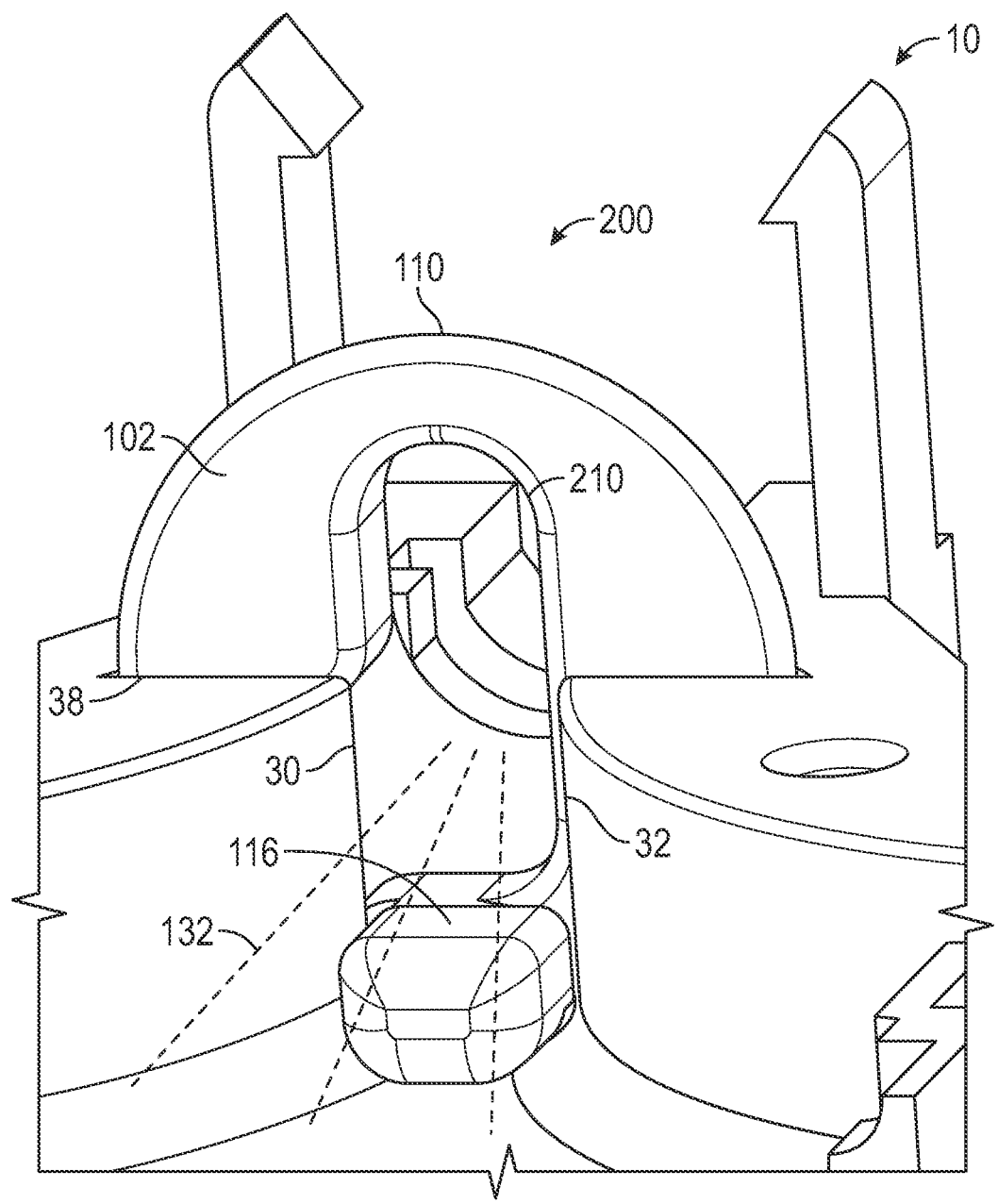
FIG. 15 is a perspective view of a fiber control collar of FIG. 10 inserted into a connector backshell component of FIG. 1.
Figure 16:
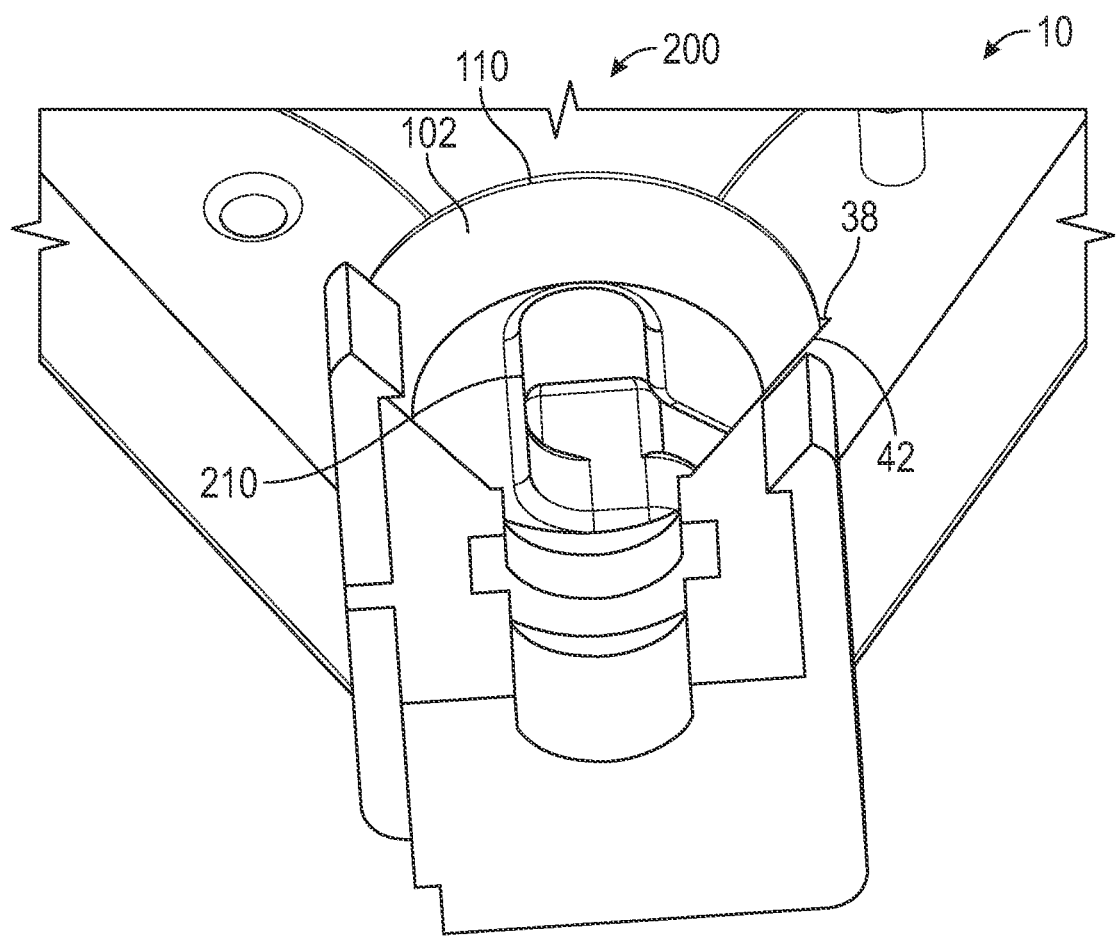
FIG. 16 is a perspective view of a fiber control collar of FIG. 10 inserted into a connector backshell component of FIG. 1.

The collar 200 includes an opening 210 substantially similar to the opening 114. In particular, the opening 210 generally defines a substantially cylindrical configuration. However, due to the gap 202 formed in the body 102, the opening 210 connects with the gap 202 forming a passage between the outside of the collar 200 and the opening 210. The gap 202 allows for fibers to be passed into the opening 210 of the collar 200 before or after the fibers have been terminated on the one or more connector housings. For example, as illustrated in FIGS. 14-16, rather than passing the fibers 132 through the opening 210 and subsequently terminating the fibers 132 (as is performed using the collar 100), the fibers 132 can instead be terminated first, and subsequently passed through the gap 202 and into the opening 210 of the collar 200.

After the fibers 132 are within the opening 210, the collar 200 can be at least partially inserted into the hollow section 36 of the connector backshell component 10. As illustrated in FIGS. 15-16, due to the radial extension of the body 102 beyond 270 degrees, when the collar 200 is inserted into the hollow section 36, the structure of the wall 26 covers the gap 202 of the collar 200 entirely, preventing fibers 132 from escaping from the opening 210. The collar 200 therefore maintains the fibers 132 in a secure position prior to coupling an opposing connector backshell component 10 with the connector backshell component 10 shown in FIGS. 14-16.

Figure 17:
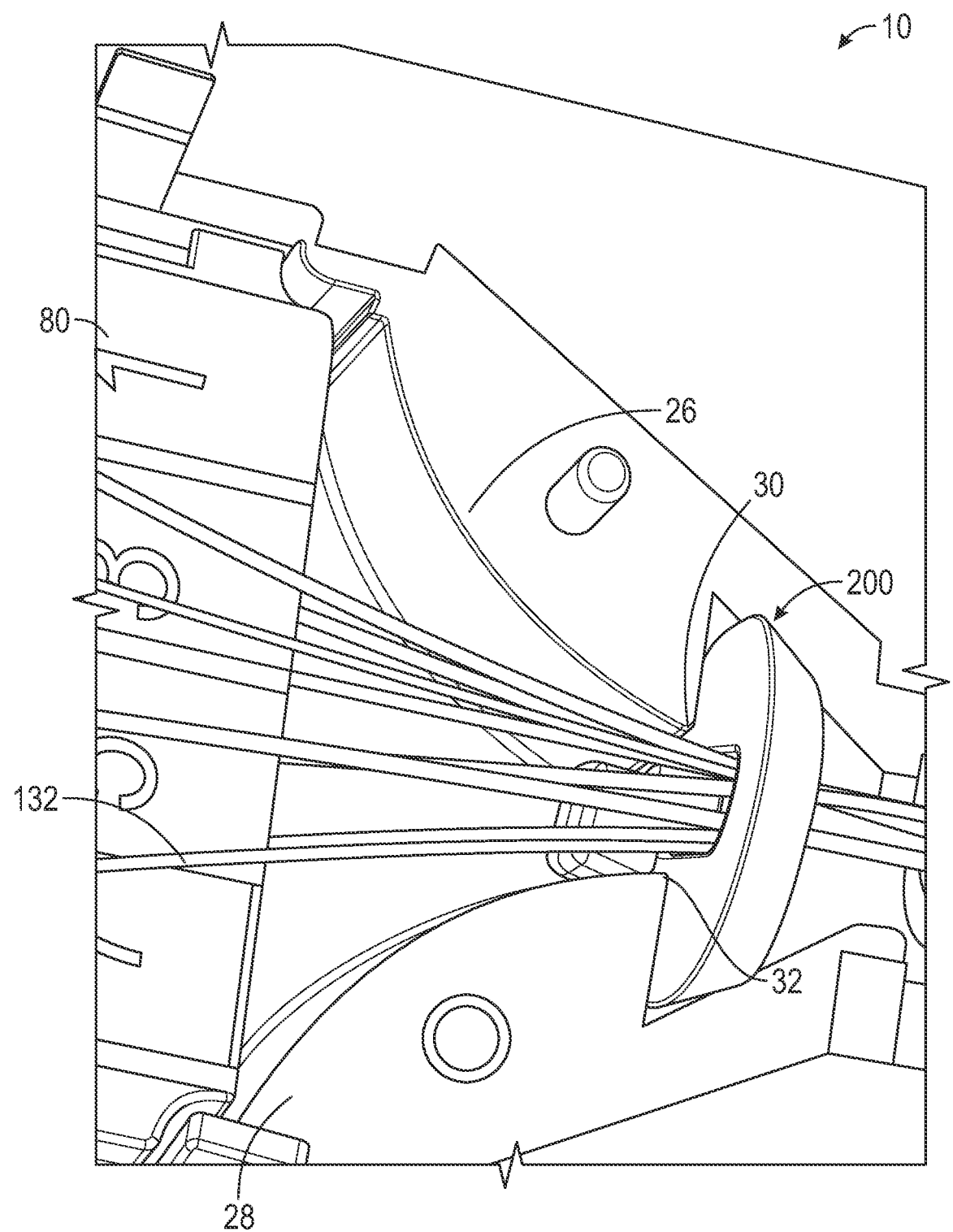
FIG. 17 is a perspective view of a fiber control collar of FIG. 10 inserted into a connector backshell component of FIG. 1.

FIG. 17 shows a collar 200 inserted into the connector backshell component 10. At one end, the fibers 132 are terminated at one or more connector housings 80. The fibers 132 are passed through the opening 210 in the collar 200 (before or after termination), and the collar 200 has been inserted into the hollow section 36 of the connector backshell component 10. The collar 200 maintains the fibers 132 in a position away from potential pinch points during assembly of two connector backshell components 10. Technician error is therefore significantly reduced, resulting in improved overall operation of the assembled fiber optic connector.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A fiber control collar, comprising:
a body including a front surface, an opposing rear surface, and an exterior geometry between the front surface and the opposing rear surface dimensioned to fit conformally into a complementary hollow section of a connector housing;
an opening formed in and extending through the body from the front surface to the rear surface; and
a protrusion extending from the front surface.

2. The fiber control collar of claim 1, wherein the body and protrusion are configured to be at least partially inserted into a complementary hollow section of a connector backshell component.

3. The fiber control collar of claim 1, wherein the front surface extends parallel to the opposing rear surface.

4. The fiber control collar of claim 1, wherein the exterior geometry of the body includes a tapering side wall extending from the front surface to the rear surface.

5. The fiber control collar of claim 4, wherein the body includes a front edge at the front surface and a rear edge at the opposing rear surface, a diameter of the front edge dimensioned greater than a diameter of the rear edge.

6. The fiber control collar of claim 4, wherein the body defines a conical configuration.

7. The fiber control collar of claim 1, wherein the opening defines an oval configuration, and wherein an edge of the opening at the front surface of the body and an edge of the opening at the rear surface of the body are curved.

8. The fiber control collar of claim 1, wherein the protrusion extends perpendicularly from the front surface.

9. The fiber control collar of claim 1, wherein the protrusion includes a top surface, a bottom surface, side surfaces, and a front surface.

10. The fiber control collar of claim 9, wherein the top surface of the protrusion is aligned with a bottommost surface of the opening.

11. The fiber control collar of claim 9, wherein the bottom surface of the protrusion includes a stepped feature with a vertical section and a horizontal section.

12. The fiber control collar of claim 11, wherein the horizontal section of the stepped feature is aligned with a bottommost edge of the front surface of the body.

13. The fiber control collar of claim 1, wherein the body extends 360 degrees around the opening.

14. The fiber control collar of claim 1, wherein the body extends less than 360 degrees around the opening.

15. The fiber control collar of claim 14, comprising a gap formed in the body, the gap connecting the opening with an exterior edge of the body.

16. A fiber control system, comprising:
a connector backshell component including a body with a hollow section formed therein, and an interior volume configured to receive means for fiber termination; and
a fiber control collar, including (i) a body including a front surface and an opposing rear surface, (ii) an opening formed in and extending through the body from the front surface to the rear surface, and (iii) a protrusion extending from the front surface;
wherein the hollow section of the connector backshell component is configured to at least partially receive the fiber control collar; and
wherein the body of the fiber control collar includes an exterior geometry between the front surface and the opposing rear surface dimensioned to fit conformally into the hollow section of the connector backshell component.

17. The system of claim 16, wherein the hollow section of the connector backshell component includes a proximal wall and a distal wall or edge, the proximal wall defining a diameter greater than a diameter of the distal wall or edge.

18. The system of claim 17, wherein the hollow section of the connector backshell component includes a tapering side wall extending from the proximal wall to the distal wall or edge.

19. The system of claim 18, wherein the exterior geometry of the fiber control collar includes a tapering side wall extending from the front surface to the rear surface, the diameter of the front surface and the tapering side wall of the fiber control collar is dimensioned complementary to the proximal wall and the tapering side wall of the hollow section of the connector backshell component.

20. A method of fiber control, comprising:

feeding fibers of a fiber optic cable through an opening formed in and extending through a body of a fiber control collar, the body of the fiber control collar including a front surface and an opposing rear surface, and the fiber control collar including a protrusion extending from the front surface;

positioning the fiber control collar at least partially into a complementary hollow section of a first connector backshell component, the fiber control collar maintaining the fibers in a position away from pinch points of the first connector backshell component, wherein the body of the fiber control collar includes an exterior geometry between the front surface and the opposing rear surface dimensioned to fit conformally into the complementary hollow section of the first connector backshell component; and engaging a second connector backshell component with the first connector backshell component.

* * * * *